United States Patent [19]

Rashbrook et al.

[11] 4,354,016
[45] Oct. 12, 1982

[54] METHOD OF PREPARING POLYESTERS MODIFIED WITH TRIHYDROXYBENZOPHENONE

[75] Inventors: Robert B. Rashbrook, Hatfield; Patrick J. Horner, Welwyn Garden City, both of England

[73] Assignee: Imperial Chemical Industries Limited, London, England

[21] Appl. No.: 210,756

[22] Filed: Nov. 28, 1980

[30] Foreign Application Priority Data

Dec. 10, 1979 [GB] United Kingdom ............... 7942482

[51] Int. Cl.³ ............................................. C08G 63/66
[52] U.S. Cl. .................................... 528/128; 528/126
[58] Field of Search ............... 528/190, 193, 195, 125, 528/126, 128; 260/45.75 N, 45.95 F

[56] References Cited

U.S. PATENT DOCUMENTS

| | | | |
|---|---|---|---|
| 3,308,095 | 3/1967 | Maerov | 260/45.95 F |
| 3,391,110 | 7/1968 | Coleman | 260/45.95 F |
| 3,518,175 | 6/1970 | Bell | 528/128 |
| 3,577,211 | 5/1971 | Wilson | 260/45.95 F |
| 4,232,143 | 11/1980 | Irwin | 528/128 |
| 4,284,756 | 8/1981 | Horner | 528/128 |
| 4,288,631 | 9/1981 | Ching | 528/128 |

OTHER PUBLICATIONS

Chem. Abst. 83 165233e, (1975).
Chem. Abst. 78 160979q, (1973).
Chem. Abst. 79 548076, (1973).

*Primary Examiner*—Lester L. Lee
*Attorney, Agent, or Firm*—Cushman, Darby & Cushman

[57] ABSTRACT

UV stable linear polyesters, e.g. polyethylene terephthalate, contain in their chain copolymerized 2-hydroxy-di(hydroxyalkoxy)benzophenone. The polyesters are useful for making biaxially oriented films. The polyesters can be made by polycondensation in the presence of 2,4,4'-trihydroxybenzophenone.

1 Claim, 1 Drawing Figure

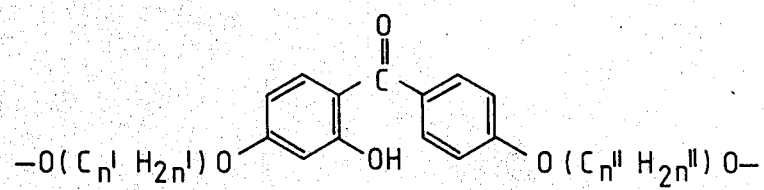
FORMULA 1

METHOD OF PREPARING POLYESTERS MODIFIED WITH TRIHYDROXYBENZOPHENONE

Linear polyesters have only poor stability under the influence of UV irradition. It is an object of this invention to improve the UV stability of linear polyesters.

Linear polyesters are well known thermoplastic polymers which have chains consisting of alternating residues of glycols and dicarboxylic acids, the residues being connected by means of ester linkages. Many acids and glycols have been proposed for the preparation of linear polyesters. The acids include (a) terephthalic acid, (b) isophthalic acid, (c) naphthalene-2,6-dicarboxylic acid, and (d) bis(carboxyphenoxy)ethane. The glycols include alkane diols with 2 to 10 carbon atoms (e.g. ethylene glycol and 1,4-butane-diol), and 1,4-dimethylol cyclohexane. By far the commonest polyester is poly(ethylene terephthalate). Other commercially used linear polyesters include (a) a copolymer of ethylene glycol with a mixture of terephthalic acid and isophthalic acid said mixture containing 80 to 95 mole % of the terephthalic acid, (b) a polymer of 1,4-butanediol and terephthalic acid, and (c) homopolymer of terephthalic acid and 1,4-dimethylolcyclohexane.

According to this invention a linear polyester contains in its molecule residues of 2-hydroxy-di(hydroxyalkoxy)benzophenones, the amount of the said 2-hydroxy-di(hydroxyalkoxy)benzophenones being 0.05 to 10% by weight, preferably 0.05 to 5% by weight, based on the total polymer.

For example such a linear polyester has an IV above 0.50 and it contains in its molecule residues of:
(A) Dicarboxylic acids selected from
  (i) terephthalic acid
  (ii) isophthalic acid
  (iii) naphthalene-2,6-dicarboxylic acid
  (iv) bis(carboxyphenoxy)ethane;
(B) Glycols with 2 to 10 carbon atoms in the molecule, e.g. ethylene glycol, 1,4-butane diol and 1,4-di-methylolcyclohexane; and
(C) trihydroxy benzophenones
the amount of (C) being between 0.05 and 10% by weight, preferably 0.05 and 5% by weight based on the amount of (A)+(B)+(C).

An important class of linear polyesters according to the invention have as repeating unit:

wherein
at least 80 mole% of the X groups represent p-phenylene and the remainder represent m-phenylene and
at least 90% of the Y groups represent —$C_nH_{2n}$— where n is an integer from 2 to 10, e.g. —$CH_2$—$CH_2$—, and at least 0.1% of the Y groups represent residues of 2-hydroxy-di(hydroxyalkoxy)benzophenones said residues having the formula 1 where n' and n" are integers from 1 to 10, e.g. n'=n"=2.

(Formula 1 is given in the accompanying drawing.)
The invention includes polyesters as described above which also contain in their molecule 0.05 to 10% by weight, preferably 0.05 to 5% by weight of residues of 2,4-dihydroxy benzoic acid. Preferably the mole ratio of trihydroxy benzophenone to benzoic acid residues is 1:1 to 1:0.7.

Linear polyesters are obtained by a two-stage process. A precursor is obtained in the first stage. This precursor is a low molecular weight ester of the glycol and the dicarboxylic acid. In the second stage the precursor is subjected to polycondensation to increase its molecular weight and thereby obtain the polyester.

There are two common methods for preparing the precursor. In the ester interchange method the glycol is reacted with a dialkyl ester of the dicarboxylic acid. A low molecular weight alcohol is removed thus forming the glycol ester by ester interchange. For example ethylene glycol is reacted with dimethyl terephthalate to form ethylene glycol terephthalate and methyl alcohol (which is removed by distillation). The rate of reaction can be increased by incorporating ester interchange catalysts in the reaction mixture. Suitable ester interchange catalysts include zinc acetate, manganese acetate, calcium acetate, cobalt acetate and titanium tetraisopropoxide.

In the direct esterification method the glycol and the acid are esterified to form the glycol ester with the removal of water, e.g. ethylene glycol is esterified with terephthalic acid. It is usual to carry out direct esterification without catalysts. However, under the acidic conditions which apply during direct esterification, ethylene glycol tends to dimerise according to the reaction:

Some of the diethylene glycol produced by this reaction gets incorporated into the polymer chain but small amounts cause no adverse effects except a lowering of the softening point. The formation of diethylene glycol can be reduced, and hence the softening point kept at a satisfactory level, by including an alkaline compound, e.g. sodium hydroxide, in the direct esterification reaction mixture.

The second stage is carried out by heating the precursor at a temperature above its melting point under low pressure, e.g. below 5 mbar, with stirring. During polycondensation glycol is eliminated (and removed by distillation). As the reaction proceeds the molecular weight and viscosity increase. The increase in viscosity can be used to ascertain when the desired molecular weight has been achived; usually the reaction is terminated when the IV is in the range 0.5 to 1.0.

Polycondensation catalysts are usually incorporated during the polycondensation. Suitable polycondensation catalysts include antimony trioxide, germanium dioxide, mixtures of these two, titanium alkoxides, lead oxides and zinc. Some catalysts, e.g. germanium dioxide, are conveniently dissolved in alkali before they are added to the reaction system. In such cases it is particularly appropriate to utilise the alkali which is present in the direct esterification stage to dissolve the catalyst (even though the catalyst has no effect upon the direct esterification).

The metals present during stage 1 remain in the polymer and, when colourless products are needed, it is necessary to avoid the residues being in the form of coloured derivatives. An acid of phosphorus or an ester of such an acid can be added to the polycondensation mixture; these compounds reduce the colour caused by the metals. Specific examples of phosphorus compounds suitable for adding to the polycondensation reaction include phosphoric acid, triphenyl phosphates and phosphorous acid.

European patent application No. 0 006 686 A2 published on Jan. 9, 1980 (which corresponds with U.S. Pat. No. 4,284,756), describes a method of making linear polyesters, especially polyethylene terephthalate, by polycondenation in the presence of 0.04% to 20% by weight, preferably 0.04 to 5% by weight, based on the total reactants of a dihydric phenol heat stable at 250° C. In particular it describes polycondensation in the presence of 2,2',4,4'-tetrahydroxybenzophenone to obtain polyesters containing xanthone residues.

It is well known that phenols are difficult to esterify with carboxylic acids and therefore phenols cannot readily be incorporated into the chain of a polyester by this method. We have found, most unexpectedly, that phenolic groups that are not intramolecularly hydrogen bonded react with (combined or uncombined) glycol present in the system to form an ether linkage thereby converting the phenol to a hydroxyalkoxy derivative. This derivative forms ester linkages with acid residues in the precursor. The overall reaction can be represented as follows (where HOOCACOOH represents the dicarboxylic acid; HOGOH represents the glycol and HOXOH represents the phenol with two active phenol groups).

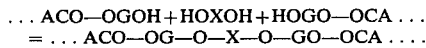

... ACO—OGOH+HOXOH+HOGO—OCA ...
= ... ACO—OG—O—X—O—GO—OCA ....

We have no evidence of the mechanism whereby the reaction occurs but we are able to demonstrate the overall effect because:
(a) the phenol cannot be extracted or detected in the polyester,
(b) if the polyester is hydrolysed to its acid and glycol the hydroxyalkoxy derivative of the phenol is present in the hydrolysate,
(c) the spectrographic results ae compatible with the structure proposed for the product of the reaction.

Our invention includes two methods of preparing linear polyesters containing 2-hydroxy-di(hydroxyalkoxy)benzophenone residues (i.e. polyesters as described above).

METHOD 1

The polyesters are prepared by polycondensation in the presence of 0.04 to 10% by weight, preferably 0.04 to 5% by weight, based on the total reactants, of 2,4,4'-trihydroxy benzophenone (which may be added either to the precursor or the ingredients from which the precursor is obtained).

METHOD 2

The linear polyesters are prepared by incorporating a 2-hydroxy-di(hydroxyalkoxy)benzophenone, preferably the 4,4'-isomer, in either the precursor or into the ingredients from which the precursor was made.

Method 2 is particularly suitable for polyesters based on glycols other than ethylene glycol, e.g. polybutyleneterephthalate.

The polyesters according to the invention can be converted to shaped articles which have good stability to UV irradiation. The shaped articles include fibre and films, e.g. metallised film and coextruded laminates which have the polymer according to the invention as one or both outer layers. The metallised films may be used as reflectors in solar energy collectors. The transparent films may be used as windows, greenhouses, cloches, transparent coverings for solar cells.

The shaped articles may be made entirely from the polyesters according to the invention or they may be made from blends of this polymer and conventional polyesters.

The preparation of a polymer according to the invention will now be described by way of example.

In the Examples 2,4,4'-trihydroxy benzophenone will be abbreviated to THBP.

EXAMPLE 1

This Example describes the preparation of a linear polyester according to the invention using a two-stage process comprising (1) direct esterification followed by (2) polycondensation. To start Stage 1, the following reactants were charged to an autoclave:
60.5 kg—terephthalic acid
30 liters—ethylene glycol
3.5 g—germanium dioxide
3.5 g—sodium hydroxide (For convenience of handling the $GeO_2$ and the NaOH were both dissolved in the same small portion, about 50 g, of the ethylene glycol.

The autoclave was pressurised to about 3 atm and heated with stirring. The reaction commenced and water of esterification was removed with some of the excess of glycol. The temperature remained at the reflux temperature. All the water of esterification had been removed in about 2.5 hours when the temperature had risen to 248° C. The pressure was released over a period of about 5 minutes and a small amount (about 5 liters) of glycol removed. This completed the (conventional) direct esterification and 119 g of triphenylphosphate (in methanol) were added. 77 kg of product, which was a conventional precursor for the preparation of polyethylene terephthalate, were obtained and used for polycondensation.

The precursor was then transferred to the polycondensation vessel and prepared for Stage 2, i.e. polycondensation, by the addition of 700 g THBP, i.e. 0.91% by weight of the precursor, and 21 g of antimony trioxide. Removal of glycol was started by distillation at 230° C. under atmospheric pressure with stirring. When the distillation had started, the pressure was slowly reduced to 0.3 m bar and the temperature was kept at 290° C. The pressure was allowed to return to atmospheric, the polymer was removed from the polycondensation vessel and cut into chip. The total weight of the polymer was 61 kgs.

It is emphasized that the preparation described in Example 1 is conventional except for the addition of THBP. The polymer was film-forming quality poly(ethylene terephthalate) having an IV of 0.6 and a softening point of 254°. It contained about 1% by weight of residues of 2-hydroxy-4,4'-di(hydroxyethoxy)benzophenone, i.e. residues of Formula 1 where $n'=n''=2$.

EXAMPLE 2

The chip from Example 1 was converted to biaxially oriented film 125 microns thick.

The stability of the films to UV irradiation was substantially better than conventional poly(ethyleneterephthalate) and they also showed good UV screening properties.

Analysis of the chip of Example 1 and the films of Example 2 showed:
(a) there was no detectable THBP in the polymer or film, (b) after hydrolysis of polymer and film to terephthalic acid and ethylene glycol, there was no detectable THBP in the hydrolysate,
(c) the hydrolysate contained 2-hydroxy-4,4'-di(hydroxyethoxy)benzophenone but this compound could not be extracted from the polymer or film.
(d) The hydrolysate also contained residues of 2,4-dihydroxybenzoic acid.

EXAMPLE 3

This Example describes the preparation of a linear polyester according to the invention using a two-stage process comprising (1) direct esterification followed by (2) polycondensation. To start Stage 1, the following reactants were charged to an autoclave:
60.5 kg—terephthalic acid
30 liters—ethylene glycol
0.7 kg—2,4,4'-trihydroxybenzophenone
3.5 g—germanium dioxide
3.5 g—sodium hydroxide
(For convenience of handling the GeO₂ and the NaOH were both dissolved in the same small portion, about 50 g, of the ethylene glycol.)

The autoclave was pressurised to about 3 atm and heated with stirring. The reaction commenced and water of esterification was removed with some of the excess of glycol. The temperature remained at the reflux temperature. All the water of esterification had been removed in about 2½ hours when the temperature had risen to 248° C. The pressure was released over a period of about 5 minutes and a small amount (about 5 liters) of glycol removed. This completed the direct esterification and 119 g of triphenylphosphate (in methanol) were added. 77 kg of product, which was a conventional precursor for the preparation of polyethylene terephthalate, were obtained and used for polycondensation. The precursor was then transferred to the polycondensation vessel and prepared for Stage 2, by the addition of 21 g of antimony trioxide. Removal of glycol was started by distillation at 230° C. under atmospheric pressure with stirring. When the distillation had started the pressure was slowly reduced to 0.3 m bar and the temperature was kept at 290° C. The pressure was allowed to return to atmospheric, the polymer was removed from the polycondensation vessel and cut into chip. The total weight of the polymer was 61 kg.

It is emphasized that the preparation described in Example 3 is also conventional except for the addition of the 2,4,4'-trihydroxy-benzophenone. The polymer was film-forming quality poly(ethylene terephthalate) having an IV of 0.6 and a softening point of 254°. It contained about 1% by weight of residues of 2-hydroxy-4,4'-di(hydroxyethoxy)benzophenone, i.e. residues of Formula 1 where n'=n''=2. Film was prepared from the polymer which had the same film forming properties as the polymer of Example 1 but its UV stability was even better than that of Example 1.

Analysis of the polymer of Example 3 and the films made from it showed:
(a) there was no detectable 2,4,4'-trihydroxy benzophenone,
(b) after hydrolysis of polymer and film to terephthalic acid and ethylene glycol, there no detectable 2,4,4'-trihydroxy benzophenone in the hydrolysate,
(c) the hydrolysate contained 2-hydroxy-4,4'-di(hydroxyethoxy)benzophenone but this compound could not be extracted from the polymer or film,
(d) the hydrolysate contained no detectable 2,4-dihydroxybenzoic acid.

EXAMPLE 4

Residues of 2-hydroxy-4,4'-di(hydroxyethoxy)benzophenone were incorporated into poly(butyleneterephthalate) using a two stage method wherein stage 1 comprised ester interchange between 1,4-butane diol and dimethyl terephthalate and stage 2 comprised polycondensation of the precursor of stage 1 in the presence of 2-hydroxy-4,4'-di(hydroxyethoxy)benzophenone.

To carry out stage 1 the following were charged to the ester interchange vessel:
640 g—dimethylterephthalate
593 g—1,4-butanediol
0.1 g—titanium tetraisopropoxide.
(The third ingredient, the transesterification catalyst, was added as 1% solution in butanol.)

The reaction mixture was initially heated at 156° C. and the heating continued until 267 mls of methanol had been collected when the temperature of the reaction mixture had risen to 218° C. The reaction mixture was allowed to cool to 170° C. when it was poured into a tray where it solidified at room temperature. It cooled to a white solid which was the precursor for stage 2.

To carry out stage 2 (polycondensation) the following reactants were used:
100 g—Precursor (from stage 1)
2.0 g—2-hydroxy-4,4'-di(hydroxyethoxy)benzophenone
0.6 g—titanium tetraisopropoxide.
The polycondensation mixture was heated at 245° C. under 0.4 mm Hg until a suitable melt viscosity had been achieved.

The product was poly(tetramethylene terephthalate) which contained residues of the 2-hydroxy-4,4'-di(hydroxyethoxy)benzophenone. It had excellent UV stability.

EXAMPLE 5

The method of Example 1 was repeated adding 700 g of 2-hydroxy-4,4'-di(hydroxyethoxy)benzophenone to the polycondensation mixture instead of 2100 g THBP.

The resultant polyester contained about 1% by weight of 2-hydroxy-4,4'-di(hydroxyethoxy)benzophenone residues and it was substantially the same as that of Example 1. It more closely resembled the product of Example 4 in that it had very good UV stability and there appeared to be no residues of 2,4-dihydroxybenzoic acid in the polymer.

EXAMPLE 6

The method of Example 1 was repeated using 2,6-naphthalene-dicarboxylic acid instead of terephthalic acid.

EXAMPLE 7

A precursor was obtained by transesterifying the following ingredients:
70 kg—dimethylester of bis(carboxyphenoxy)ethane
35 liter—ethylene glycol
30 g—manganese acetate (catalyst)
1400 g of THBP and 35 g antimony oxide were added to the precursor and the mixture subjected to polycondensation as described in Example 1.

The polyester of Examples 6 and 7 had good properties, including good UV stability. The results showed that the THBP was converted into 2-hydroxy-4,4'-di(-hydroxyethoxy)benzophenone residues which were incorporated in the polyester chain.

We claim:

1. A method of making a linear polyester which has as its repeating unit:

—O—Y—O—CO—X—CO— wherein at least 80 mole % of the X groups represent p-phenylene and the remainder represent m-phenylene and at least 90% of the Y groups represent —CH₂CH₂— and at least 0.1% of the Y groups represent esterification residues of the formula

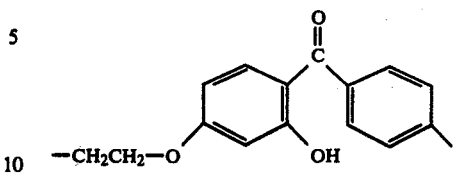

said method comprising polycondensing a glycol terephthalate precursor in the presence of 2,4,4'-trihydroxybenzophenone.

* * * * *